INVENTOR.
ROBERT B. LAUCK
BY
*Young, Flynn & Tarolli*
ATTORNEYS

INVENTOR.
ROBERT B. LAUCK
BY
Young, Flynn, & Tarolli
ATTORNEYS

April 21, 1970    R. B. LAUCK    3,507,117
HYDROSTATIC TRANSMISSION CONTROL SYSTEM
Filed May 1, 1968    5 Sheets-Sheet 4

INVENTOR.
ROBERT B. LAUCK
BY
Yount, Flynn & Tarolli
ATTORNEYS

April 21, 1970        R. B. LAUCK        3,507,117
HYDROSTATIC TRANSMISSION CONTROL SYSTEM
Filed May 1, 1968        5 Sheets-Sheet 5
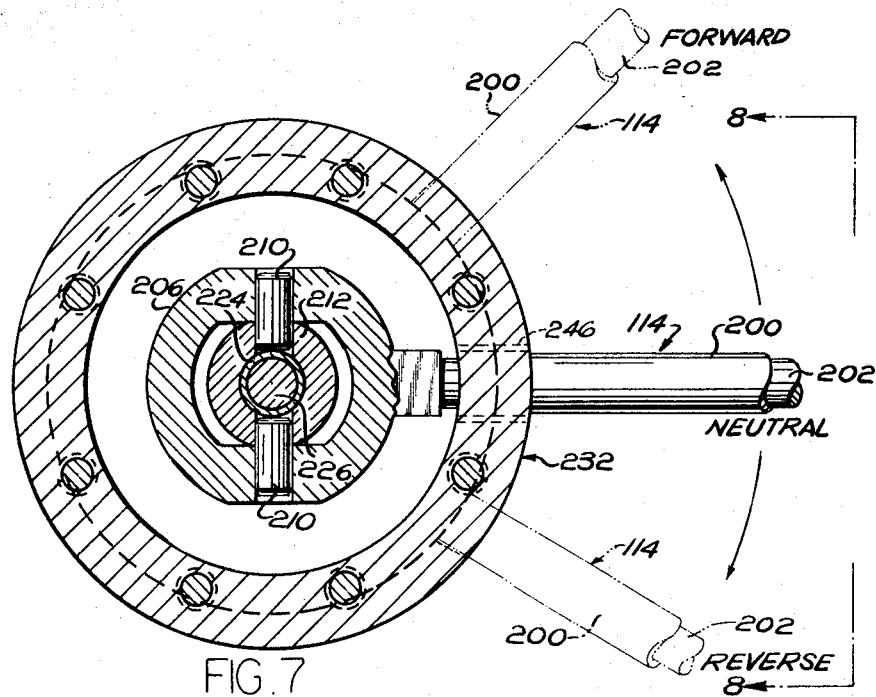
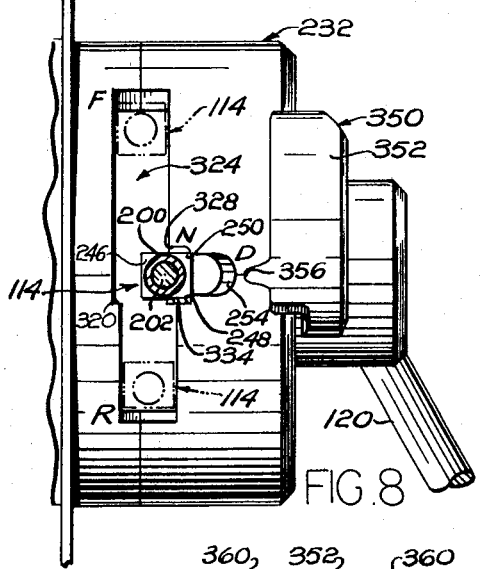
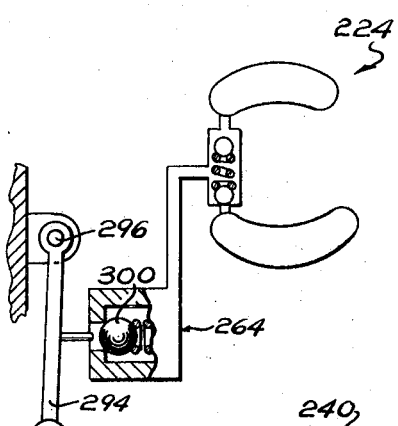
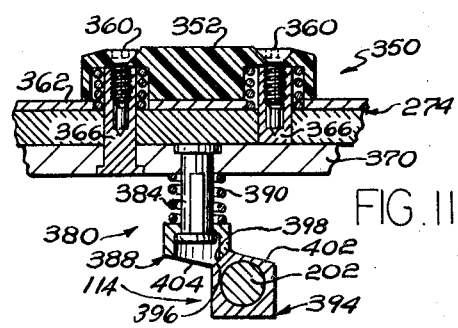
INVENTOR.
ROBERT B. LAUCK
BY
Yount, Flynn & Jarolli
ATTORNEYS

United States Patent Office 3,507,117
Patented Apr. 21, 1970

3,507,117
HYDROSTATIC TRANSMISSION CONTROL SYSTEM
Robert B. Lauck, Southfield, Mich., assignor to Eaton Yale & Towne Inc., Cleveland, Ohio, a corporation of Ohio
Filed May 1, 1968, Ser. No. 725,650
Int. Cl. F15b *15/18;* G05g *11/00;* F01b *21/12*
U.S. Cl. 60—53                            25 Claims

ABSTRACT OF THE DISCLOSURE

Disclosed herein is a control system for varying the rate of power transmission by a hydrostatic transmission. The control system includes a manually operable control assembly. A foot-operated control assembly is provided for varying to relatively limited extents the input to output speed ratio or drive ratio of the hydrostatic transmission independently of manually operable control assembly. The manually operable control assembly includes a manually movable lever which is selectively operable to a dump position in which the hydrostatic transmission is incapable of transmitting power.

---

This invention relates generally to a control system, and more particularly to a control system for a hydrostatic transmission.

It is an object of this invention to provide a new and improved apparatus for controlling the operation of a hydrostatic transmission including one control means for varying the input to output speed ratio or drive ratio of the hydrostatic transmission to enable the output speed to be adjusted to a predetermined speed and a second control means for increasing and decreasing the input to output speed ratio of the hydrostatic transmission from the predetermined rate independently of the first control means.

Another object of the present invention is to provide a new and improved apparatus for controlling the operation of a hydrostatic transmission, as set forth in the preceding paragraph, wherein the first control means is adapted for manual operation and the second control means is adapted for foot operation.

Another object of this invention is to provide a new and improved apparatus for controlling the transmission of power by a hydrostatic transmission wherein the apparatus includes separate control means which are operable to independently vary the input to output speed ratio of the hydrostatic transmission wherein one of the control means is also operable to render the hydrostatic transmission incapable of transmitting power.

Another object of this invention is to provide a new and improved apparatus for controlling the operation of a hydrostatic transmission including a manually movable member movable from a neutral position in which the hydrostatic transmission is ineffective to transmit power from an engine associated with the hydrostatic transmission to a forward operated position in which the hydrostatic transmission is operable to transmit power in one direction at a speed which is a function of the distance which the member is moved from the neutral position, to a reverse operated position in which the hydrostatic transmission is operable to transmit power in another direction at a speed which is a function of the distance which the member is moved from the neutral position, and to dump position in which the hydrostatic transmission is incapable of transmitting power.

Another object of this invention is to provide a new and improved apparatus for controlling the operation of a hydrostatic transmission, in accordance with the preceding paragraph, and which further includes selectively settable indicator means for resiliently resisting movement of the member past a preselected position to thereby indicate to an operator of the hydrostatic transmission that the member is in the preselected position.

Another object of this invention is to provide a new and improved apparatus including a hydrostatic transmission, a control linkage assembly which is operable to vary the input to output speed ratio of the hydrostatic transmission, and a first control means for selectively operating the control linkage assembly to vary the input to output speed ratio and wherein a second control means is provided for selectively operating the control linkage assembly to increase and decrease to a relatively limited extent the input to output speed ratio of the hydrostatic transmission independently of said first control means.

Another object of this invention is to provide a new and improved apparatus comprising a hydrostatic transmission, a control linkage assembly associated with the hydrostatic transmission, a control member for selectively operating the control linkage assembly to vary the rate of power transmission by the hydrostatic transmission, and wherein a means operable by said control member is provided for rendering said hydrostatic transmission incapable of transmitting power.

These and other objects and features of the invention will become more apparent upon a reading of the following description taken in connection with the accompanying drawings wherein:

FIG. 7 is a sectional view, taken along the line 7—7 of FIG. 6, further illustrating the structure of the manual control assembly;

FIG. 8 is a view, taken along the line 8—8 of FIG. 7, illustrating the structure of a housing for limiting movement of a control lever of the manual control assembly;

FIG. 9 is a schematic illustration of a dump assembly for rendering the hydrostatic transmission incapable of transmitting power;

FIG. 10 is a plan view, taken along the line 10—10 of FIG. 6, illustrating the structure of a selectively settable indicator assembly for indicating to an operator of the manual control assembly when the control lever is in a preselected position; and FIG. 11 is a sectional view further illustrating the structure of the indicator assembly.

The present invention provides a control system having separate manual and pedal control assemblies which operate a common control linkage assembly to independently vary the input to output speed ratio of a hydrostatic transmission. The manual control assembly is also selectively operable to render the hydrostatic transmission incapable of transmitting power. Although the control system can be used in many different environments, it is particularly well suited for use in vehicles, such as tractors.

Figure 1:
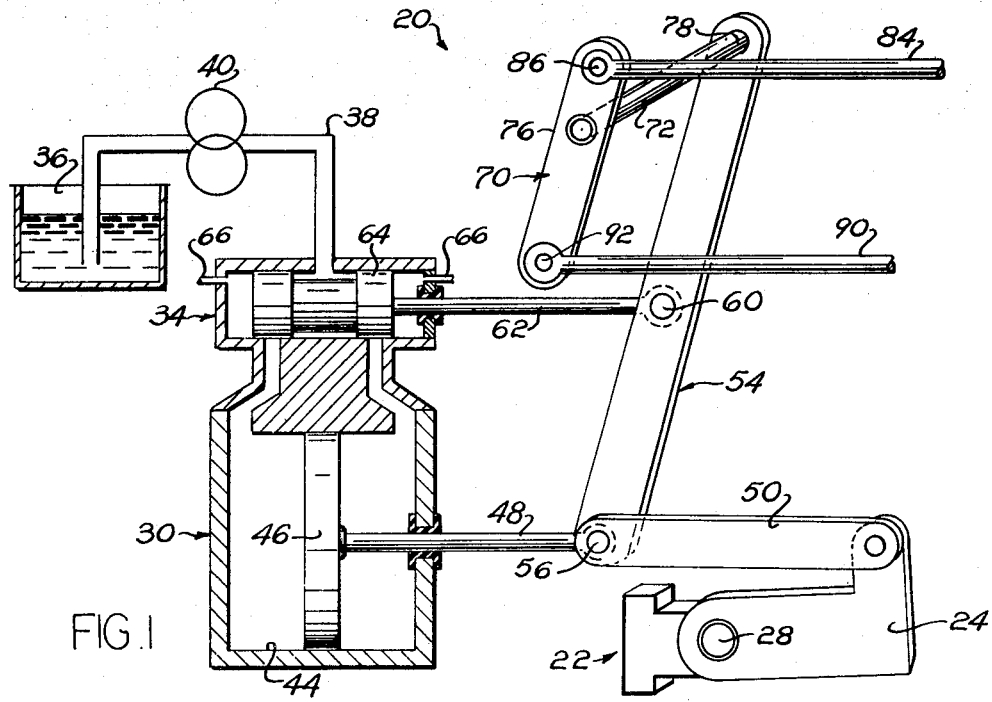
FIG. 1 is a schematic illustration of a control linkage assembly for operating a servomotor and servomotor control valve to vary the input to output speed ratio of a hydrostatic transmission, the control linkage assembly being shown in a neutral position.

A control linkage assembly 20 for controlling the operation of a hydrostatic transmission 22 is shown in FIG. 1. For purposes of clarity of illustration, only a pump section 24 of the hydrostatic transmission 22 is schematically illustrated in FIG. 1. The pump section 24 is pivoted about an axis 28 by operation of a servomotor 30 to vary the drive ratio or input to output speed ratio of the hydrostatic transmission 22. The drive ratio and thus the rate of power transmission is varied, in a well-known manner, by adjusting the "swash" or relative angular positions of pump and motor assemblies of the hydrostatic transmission.

A servomotor control valve 34 is provided for regulating the flow of fluid from a reservoir 36 through a conduit 38 to the servomotor 30 under the inflence of a pump 40. When the valve 34 is moved from the closed position of FIG. 1 to either a forward open position (shown in FIG. 2) or a reverse open position (displaced to the left of the position shown in FIG. 1), fluid flows into a cylinder 44 to move a piston 46. The piston 46 is connected by a piston rod 48 and link 50 to the pump section 24 of the hydrostatic transmission 22. Therefore, movement of the piston 46 moves the pump section 24 of the hydrostatic transmission 22 to vary the input to output speed ratio of the hydrostatic transmission in a known manner. The construction of the hydrostatic transmission 22 and the associated servomotor 30 is well understood by those skilled in the art and can take many different forms, for example the forms set forth in U.S. Patent No. 3,142,964 to Thoma et al. and in application Ser. No. 645,194, filed on June 12, 1967 by Edward J. Bojas and now U.S. Patent No. 3,448,578. Therefore, it is believed that the structure of the hydrostatic transmission 22 and servomotor 30 will be apparent to those skilled in the art without further description at this time.

The control linkage assembly 20 includes a control lever 54 which is pivotally connected at 56 to the hydrostatic transmission 22 by the link 50 and to the servomotor 30 by the piston rod 48. Operation of the servomotor 30 moves both the pump section 24 and control lever 54 to thereby effect a variation in the input to output speed ratio of the hydrostatic transmission 22 and to move the control lever 54 by an amount which is a function of the variation in the input to output speed ratio. The control lever 54 is also pivotally connected at 60 to a rod 62 which is connected to a valve element or spool 64 of the servomotor control valve 34. Bleed lines 66 are provided at opposite ends of the control valve 35 to enable fluid to escape upon movement of the valve spool 64. Therefore, movement of the control lever 54 by the servomotor 30 operates the servomotor control valve 34 to an extent which is proportional to the extent of movement of the control lever 54.

An actuator lever 70 is pivotally connected by a shaft or member 72 to the control lever 54. The shaft 72 is rotatably connected at 76 to the actuator lever 70 and is rotatably connected at 78 to the control lever 54 so that rotational forces are not transmitted between the control lever 54 and the actuator lever 70. Since the servomotor control valve 34 is connected to the control lever 54 which is in turn connected to both the actuator lever 70 and the servomotor 30, the servomotor control valve 34 is operable through the control lever 54 by movement of either the actuator lever 70 or operation of the servomotor 30.

The actuator lever 70 is movable by a first or hand control link 84, pivotally connected to the actuator lever 70 at 86, to effect a corresponding movement of the control lever 54. Similarly, a second or foot control link 90 is pivotally connected at 92 to the actuator lever 70 to enable the control lever 54 to be operated by movement of the link 90. Since movement of the control lever 54 operates the servomotor control valve 34 through the rod 62, the control links 84 and 90 are movable to operate the servomotor 30 to thereby vary the input to output speed ratio of the hydrostatic transmission 22.

The control linkage assembly 20 is independently operated by the control links 84 and 90 to vary the input to output speed ratio of the hydrostatic transmission 22. To this end, movement of the hand control link 84 from an initial or neutral position, shown in FIG. 1, to a forward operated position, shown in FIG. 2, pivots the actuator lever 70 about the pivot connection 92 for the foot control link 90 which remains substantially stationary. The pivoting movement of the actuator lever 70 about the connection 92 results in the control lever 54 being pivoted about the connection 56 by movement of the connector member 72. Thus, actuation of the hand control link 84 in the forward direction results in a control linkage assembly 20 being moved from the initial position shown in FIG. 1 and in dashed lines in FIG. 2 to an operated position shown in solid lines in FIG. 2.

Operation of the control linkage assembly 20 opens the servomotor control valve 34 to operate the servomotor 30 to pivot the pump section 24 of the hydrostatic transmission 22 to thereby vary the input to output speed ratio of the hydrostatic transmission. Thus, when the control link 54 is pivoted about the substantially stationary connection 56 by movement of the actuator lever 70, the valve member or element 64 is moved to the forward open position of FIG. 2 to enable fluid to flow from the reservoir 36 to pump 40 and line 38 to the cylinder 44 of the servomotor 30. This fluid applies pressure against the piston 46 to move the piston to an operated position indicated in dash-dotted lines of FIG. 2. Movement of the piston 46 is transmitted to the hydrostatic transmission 22 by the piston rod 48 and link 50 to pivot the pump section 24 at the connection 28 and thereby vary the input to output speed ratio of the hydrostatic transmission. This movement of the pump section 24 pivots the control lever 54 about the pivot connection 78 to the position shown in dash-dotted lines in FIG. 2 without moving the actuator lever 70 and the control links 84 and 90.

Figure 2:
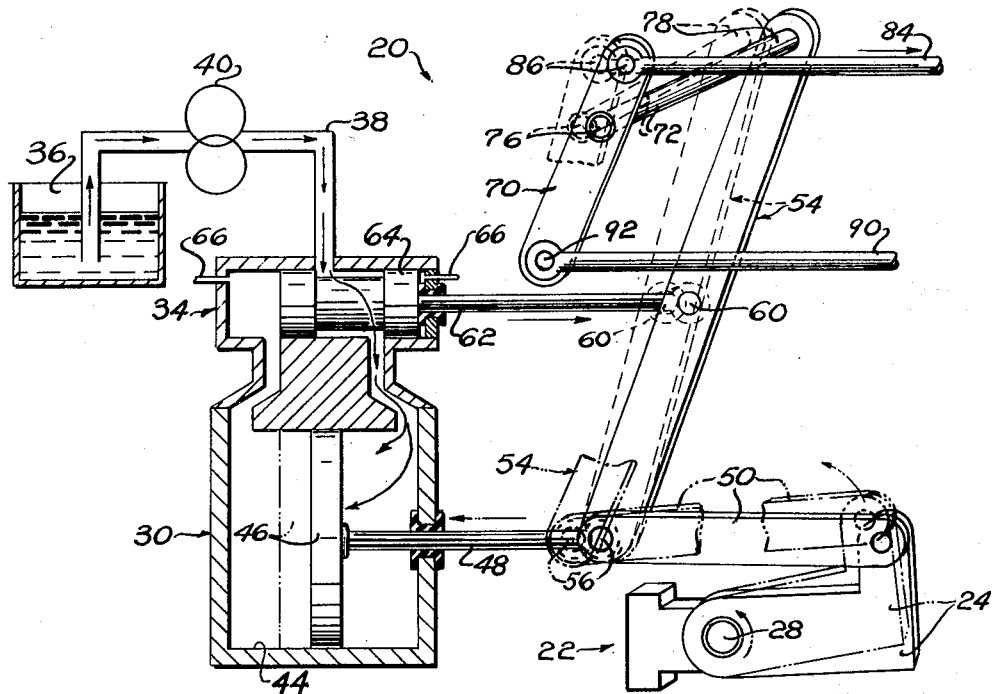
FIG. 2 is a schematic illustration of the control linkage assembly of FIG. 1 in a forward operated position.

The control valve 34 is moved from the forward open position of FIG. 2 to the closed position of FIG. 1 by this last mentioned pivoting movement of the control lever 54 to thereby block the flow of fluid to the servomotor 30 and maintain the pump section 24 at the position shown in dash-dotted lines in FIG. 2. Accordingly, pivoting movement of the control lever 54 about the pivot connection 78 by movement of the pivot connection 56 moves the pivot connection 60 back from the position shown in solid lines in FIG. 2 to the initial or neutral position shown in dash lines in FIG. 2 and in solid lines in FIG. 1. This movement of the pivot connection 60 is transmitted to the valve element 64 by the rod 62 to move the valve element 64 to the closed position. The flow of fluid to the servomotor 30 is then blocked and the control lever 54 remains in the position indicated in dash-dotted lines in FIG. 2 until the actuator lever 70 is again moved from the position indicated in solid lines in FIG. 2 by operation of one of the control links 84 or 90.

If the hand control link 84 had been moved in a reverse direction, that is toward the left as viewed in FIGS. 1 and 2, the actuator lever 70 would have been pivoted in a counterclockwise direction about the pivot connection 92 to pivot the control lever 54 in a counterclockwise direction about the pivot connection 56. This movement of the control lever 54 moves the valve element 64 to the left (as viewed in FIG. 1) from the closed position to a reverse open position. Fluid then flows into the left end (as viewed in FIG. 1) of the servomotor cylinder 44 to force the piston toward the right. This movement of the piston 46 results in the pump 24 being pivoted in a clockwise direction (as viewed in FIG. 1) to transmit power in a reverse direction.

Operation of the foot control link 90 pivots the actuator lever 70 about the pivot connection 86 to pivot the control lever 54 about the pivot connection 56 without moving the hand control link 84. Of course, pivoting movement of the control lever 54 results in the servomotor valve 34 being actuated to an open position to operate the servomotor 30 and adjust the input to output speed ratio of the hydrostatic transmission 22. Thus, either one of the control links 84 and 90 can be moved while the other control link remains stationary so that the control linkage assembly 20 is independently operable by the control links 84 and 90 to vary the input to output speed ratio of the hydrostatic transmission 22.

Figure 3:
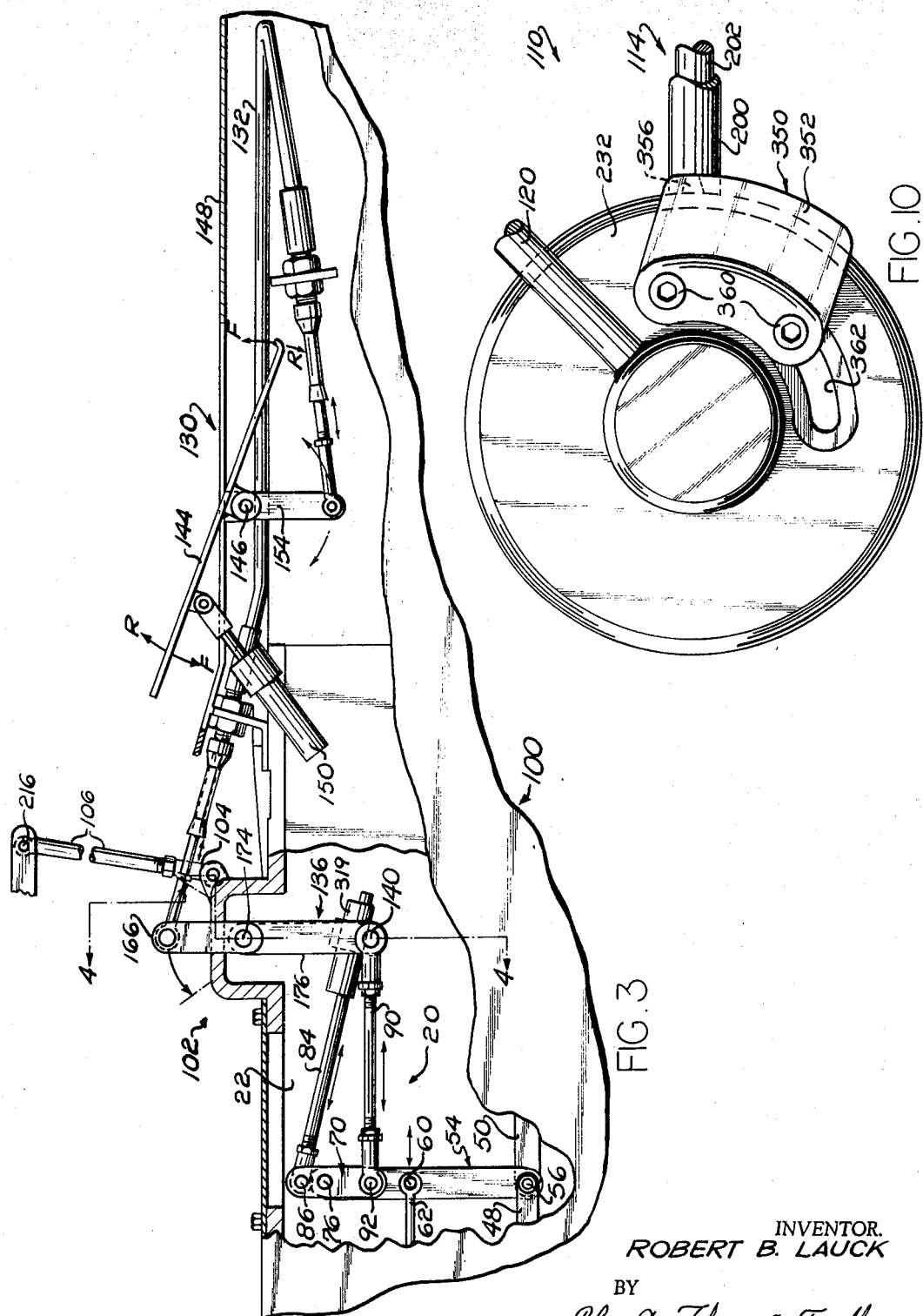
FIG. 3 is an elevational sectional view of a portion of a control system constructed in accordance with the present invention.
Figure 4:
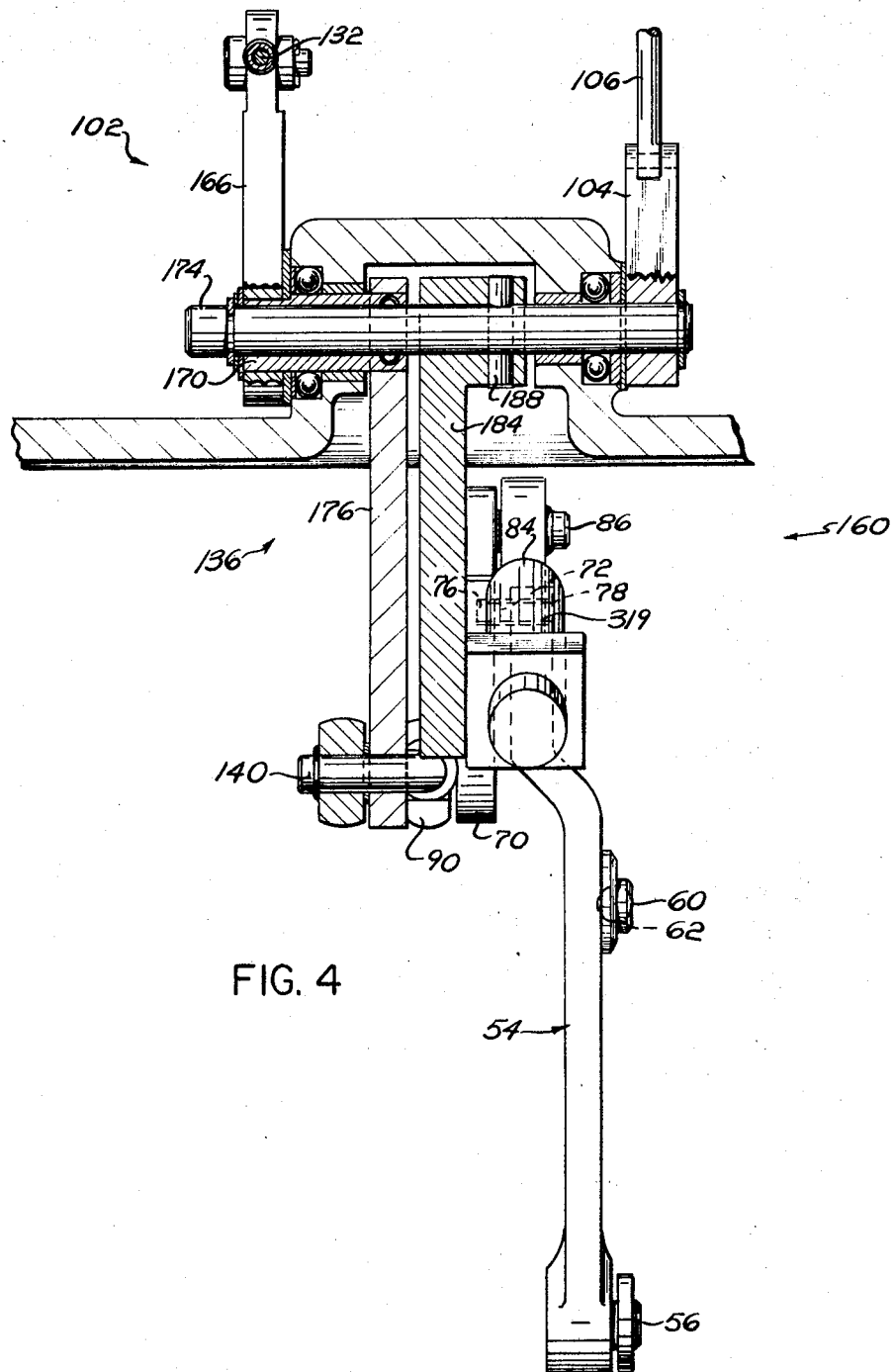
FIG. 4 is an elevational sectional view, taken along the line 4—4 of FIG. 3, illustrating the structure of a connector linkage assembly of the control system.

The control linkage assembly 20 is shown in FIG. 3 in a control system 100 for regulating the operation of the hydrostatic transmission 22 which drivingly interconnects an engine and a ground or support surface engaging drive assembly of a vehicle. The control system 100 includes a connector linkage assembly 102 having a lever arm 104 (see FIGS. 3 and 4) which is pivotally connected to a link 106 which is in turn pivotally connected to a manual control assembly 110 (see FIG. 5). A manually operable control lever 114 of the manual control assembly 110 is connected by the connector linkage assembly 102 to the control linkage assembly 20 by the first or hand link 84. Movement of the control lever 114 operates the control linkage assembly 20, through the connector linkage assembly 102, to enable the rate of power transmission by the hydrostatic transmission 22 to be varied through an operating range for the hydrostatic transmission. Thus, the control lever 114 is movable in a forward direction, indicated by the arrow F in FIG. 5, to control the operation of the hydrostatic transmission 22 through its forward operating range. Similarly, the control lever 114 is movable in a reverse direction, indicated by the arrow R in FIG. 5, to control the operation of the hydrostatic transmission 22 through its reverse operating range.

A throttle lever 120 is advantageously provided immediately adjacent to the control lever 114 to control the operation of the engine (not shown) from which power is transmitted by the hydrostatic transmission 22 to the support surface engaging drive assembly for the vehicle. Therefore, the manual control assembly 110 is operable to control the rate of power transmission in two ways, that is by operation of the manually operable control lever 114 to vary the drive ratio or rate of power transmission of the hydrostatic transmission 22 and by operation of the manually operable throttle lever 120 to control the input to output speed ratio of an associated engine to the hydrostatic transmission. It is contemplated that the setting of the throttle 120 will, for many operations, be maintained substantially constant while the speed of operation of the support surface engaging drive assembly is controlled by means of the control lever 114 which can be adjusted to a desired setting, indicated by indicia or scales 124 and 126 in FIG. 5.

A foot control assembly 130 (see FIG. 3) is operatively connected to the hydrostatic transmission 22, through the connector linkage assembly 102 and control linkage assembly 20, for both increasing and decreasing the input to output speed ratio of the hydrostatic transmission 22 for relatively limited extents relative to an input to output speed ratio corresponding to a setting or position of the manual control assembly 110. To this end, the foot control assembly 130 is connected by a bowden cable or wire 132 to a foot control lever linkage 136 (see FIG. 4) of the connector linkage assembly 102. The foot control lever linkage 136 is pivotally connected to the foot control link 90 at 140 (see FIG. 3). The foot control link 90 is in turn connected to the actuator lever 70 of the control linkage assembly 20 in the manner previously explained. Movement of the foot control link 90, by operation of the foot control assembly 130, pivots the actuator lever 70 about the pivot connection 86 (see FIG. 1) to move the control lever 54 while maintaining the position of the hand control link 84 and the setting of the manual control assembly 110 constant. Therefore, the input to output speed ratio of the hydrostatic transmission 22 can be independently varied relative to and independently of a setting or position of the control lever 114 of the manual control assembly 110 by operation of the foot control assembly 130.

To enable the input to output speed ratio to be varied while the hands of an operator of the vehicle are busy performing other functions, the foot control assembly 130 (FIG. 3) includes a pedal 144 which is pivotally supported at 146 from a floor or support surface 148 for a rocking movement against the influence of a double acting return spring assembly 150. The pedal 144 is adapted to be pivoted in a counterclockwise direction (as viewed in FIG. 3) to increase the output speed in a forward direction or decrease the output speed in a reverse direction by the hydrostatic transmission 22, as indicated by the arrows designated F in FIG. 3. Similarly, when the pedal 144 is pivoted or rocked in a clockwise direction, as indicated by the arrows designated R in FIG. 3, the output speed of the hydrostatic transmission in the forward direction is decreased or the output speed in a reverse direction is increased. This rocking movement of the pedal 144 is transmitted by a link 154 to the bowden wire or cable 132. Although the use of the foot operated pedal 144 has been found to be particularly advantageous for facilitating the operation of the associated vehicle, it is contemplated that actuators other than the foot operated pedal 144 could be used for the foot control assembly 130.

In the present embodiment of the invention, the manual control assembly 10 is selectively operated to adjust the input to output speed ratio of the hydrostatic transmission 22 through a relatively large operating range. Once the control lever 114 is set to a position corresponding to a preselected or predetermined input to output speed ratio, the foot control assembly 130 is operated to vary the input to output speed ratio while maintaining the position of the control lever 114 constant. Thus, the foot pedal 114 is selectively operable to increase and decrease the input to output speed ratio to a limited extent relative to an input to output speed ratio determined by the setting of the control lever 114. When the foot pedal 144 is released, the double acting spring assembly 150 automatically returns the foot pedal to its initial position so that power is then transmitted by the hydrostatic transmission at an input to output speed ratio corresponding to the setting of the control lever 114.

The connector linkage assembly 102 includes both the foot control lever linkage 136 (see FIG. 4) which is operable by the foot control assembly 130 and a hand control lever linkage 160 which is operable by the manual control assembly 110. The hand control lever linkage 160 and foot control lever linkage 136 are independently operable, by their respective associated control assemblies, to operate the control linkage assembly 20 and vary the input to output speed ratio of the hydrostatic transmission 22. Accordingly, the foot control lever linkage 136 includes a lever arm 166 which is pivotally connected at one end to the bowden wire or cable 132 (see FIG. 3) and at an opposite end to a sleeve 170 (FIG. 4) which is rotatably or pivotally mounted on a shaft 174. An opposite end of the sleeve 170 is fixedly connected to a lever arm 176 which is pivotally connected at 140 to the foot control link 90 (see FIG. 3). Thus, pivoting movement of the pedal 144 is transmittd longitudinally of the bowden wire or cable 132 (FIG. 3) to the lever arm 166 and the lever arm 176 to transmit the movement of the pedal 144 to the control linkage assembly 20 through the foot control link 90 which is connected to the actuator lever 70. As was previously explained, movement of the actuator lever 70 by the foot control link 90 varies the input to output speed ratio of the hydrostatic transmission 22 without disturbing the hand control link 84 and the setting of the manual control assembly 110.

The hand control lever linkage 160 is operable independently of the foot control lever linkage 136 and includes the link or lever arm 104 which is connected to the manual control assembly 110 (see FIG. 5) by the link 106 (see FIG. 3). The lever arm 104 is fixedly connected to the shaft 174 (FIG. 4) so that movement of the link 106 by operation of the manual control assembly 110 results in the shaft 174 being rotated by pivoting movement of the lever arm 104. This rotation or turning of the shaft 174 is transmitted by a lever arm 184 to the hand control link 84 and the actuator lever 70. As previously explained, the actuator lever 70 is connected by a pin or member 72 to the control lever 54 which is connected at 56 and 60 to the servomotor 30 and servomotor control valve 34 (see FIGS 1 and 2). Thus, the control lever 114 (see FIG. 5) of the manual control assembly 110 can be operated to pivot the shaft 174 through the link 106 and lever arm 104. The pivoting of the shaft 174 is transmitted to the lever arm 184 which is connected to the shaft 174 by a pin 188. Movement of the lever arm 184 is in turn transmitted to the control linkage assembly 20 by the hand link 84.

From the foregoing description it can be seen that linkage assembly 102 transmits movements of the manual control assembly 110 and foot control assembly 130 independently of each other. Accordingly, movement of the foot control assembly 130 results in the lever arms 166 and 176 being pivoted relative to the shaft 174 to operate the control linkage assembly 20 without disturbing the position of the hand control lever linkage 160. Similarly, movement of the control lever 114 of the manual control assembly results in the lever 174 being pivoted by movement of the link 106 and lever arm 104 to operate the control linkage assembly 20. This movement of the hand control lever linkage 160 does not affect the position of the foot control lever linkage 136 since the sleeve 170 of the foot control lever linkage is rotatably mounted on the shaft 174.

The control lever 114 of the manual control assembly 110 is selectively operable to control the direction in which power is transmitted by the hydrostatic transmission, the input to output speed ratio of the hydrostatic transmission and to disable or render the hydrostatic transmission incapable of transmitting power. Accordingly, the control lever 114 is movable, in the direction of the arrow F in FIG. 5, from a neutral position (indicated at N in FIG. 5) to a forward operated position to adjust the hydrostatic transmission 22 to transmit power in a forward direction. The input to output speed ratio of the hydrostatic transmission varies in proportion to the distance which the control lever 114 is moved from the neutral position. The control lever 114 is movable in a rearward direction, that is in the direction of the arrow R in FIG. 5, to operate hydrostatic transmission 22 in a reverse direction, that is a direction opposite to the direction in which it is operated when the control lever 114 is moved in the forward direction. The input to output speed ratio of the hydrostatic transmission 22 in the reverse direction is a function of the extent to which the control lever 114 is moved in a reverse direction from the neutral position.

Figure 6:
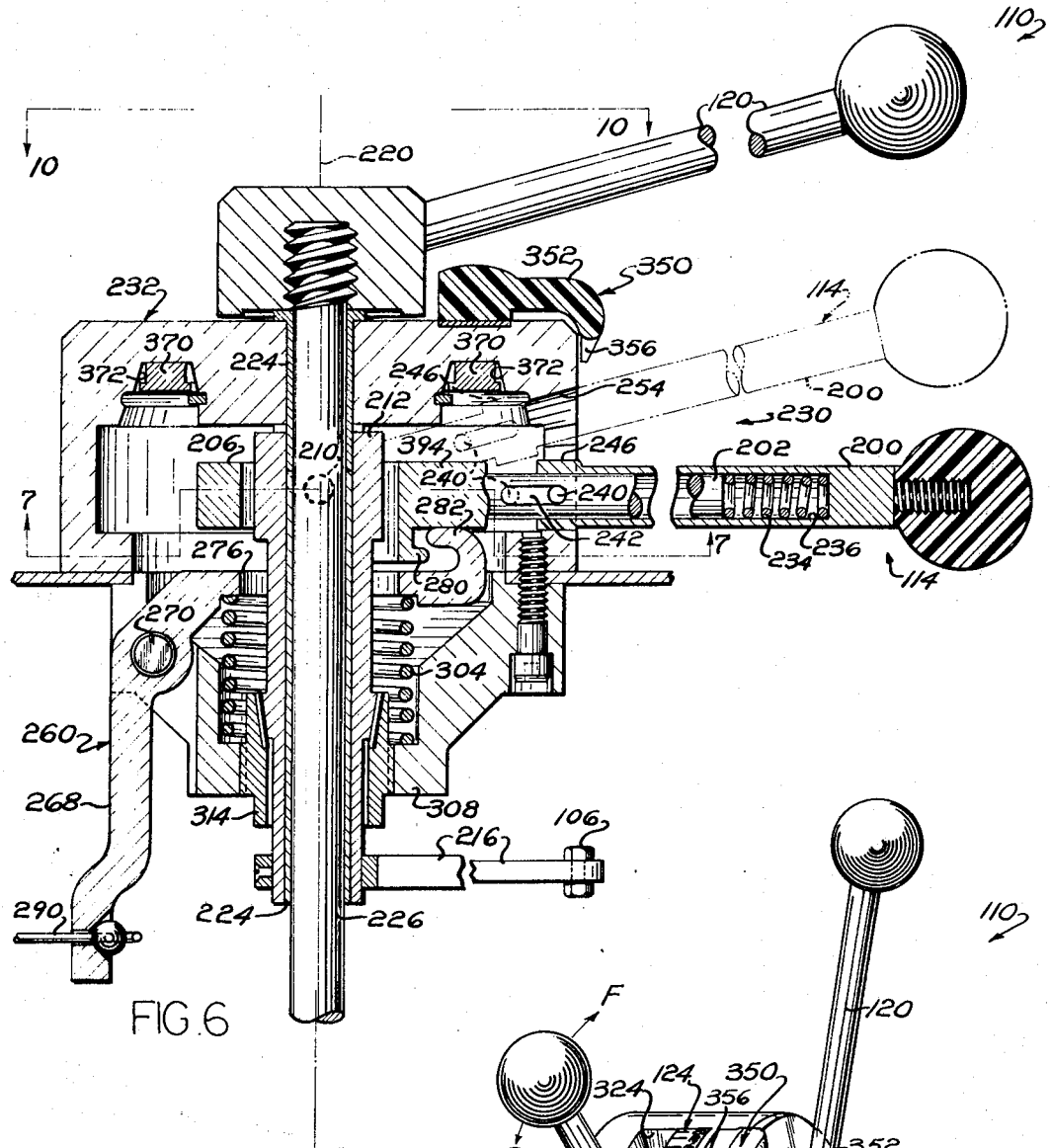
FIG. 6 is a sectional view illustrating the structure of the manual control assembly of FIG. 5.

The construction of the manual control assembly 110 is more fully disclosed in FIGS. 6 and 7 wherein it can be seen that the manually operable control lever 114 includes an outer casing 200 which has a telescopic relationship with an inner shaft 202. A yoke 206 is provided at an inner end of the shaft 202. The yoke 206 is pivotally connected by pins 210 (see FIG. 7) to a rotatable tubular sleeve 212. A lever arm 216 (see FIG. 6) is fixedly connected to the sleeve 212 and is pivotally connected to the link 106 (see FIG. 3 also). Thus, movement of the control lever 114 about a central axis 220 of the manual control assembly 110 rotates the lever arm 216 to operate the connector linkage assembly 102 through the link 106. It should be noted that cylindrical sleeve bearings 222 and 224 are provided to enable a shaft 226 connected to the throttle lever 120 to be rotated to adjust the rate of operation of the engine (not shown) associated with the hydrostatic transmission 22. The sleeve 212 is rotatable relative to the throttle shaft 226 without effecting the setting of the throttle shaft since the pins 210 (see FIG. 7) between the yoke and sleeve 212 do not engage the throttle shaft 226.

When the control lever 114 is in the neutral position, the pump section 24 of the hydrostatic transmission 22 is positioned relative to an associated motor section (not shown) so as to render the pump section ineffective to transmit power from an associated engine to the motor section of the hydrostatic transmission. However, as will be understood by those skilled in the art, the relationship between the motor and pump section is then such as to enable power to be transmitted to the engine by operating the motor section as a pump and the pump section as a motor. In accordance with the present invention, the control lever 114 is selectively operable to a dump position (indicated at D in FIG. 5) wherein the hydrostatic transmission 22 is disabled or rendered ineffective for transmitting power by draining the hydrostatic transmission to a reservoir or short circuiting the hydraulic system of the hydrostatic transmission. Thus, dumping the hydrostatic transmission results in a state of freewheeling to enable the associated vehicle to be towed or manually moved when hitching the vehicle to an implement. In addition, if the vehicle should stall due to being overloaded, the hydrostatic transmission can be dumped to safely start the vehicle after it has stalled in a forward or reverse operating condition.

An interlocking assembly 230 (see FIG. 6) is provided for preventing the control lever 114 from being inadvertently moved to the dump position during operation of the control system. To this end, a housing 232 of the manual control assembly blocks or limits movement of the control lever 114 by engaging the casing 200 which is normally biased outwardly by a spring 234 located in a chamber 236 in the casing. The outward movement of the casing 200 under the influence of the spring 234 is limited by a pin 240 which is secured to the casing 200 and extends through a slot 242 in the shaft 202. A blocking section 246 is formed on an innermost end portion of the casing 200 and engages dump stop shoulders 248 and 250 (see FIG 8) to block movement of the control lever 114 to the dump position. The casing 200 is manually pressed inwardly, against an influence of the spring 234, to move the pin 240 in the slot 242 and thereby enable the blocking section 246 to move inwardly of the shoulders 248 and 250. The control lever 114 can then be moved to the right as viewed in FIG. 8 or upwardly as viewed in FIG. 6 to the dump position indicated in dash lines in FIG. 6. A stop surface 254 limits the movement of the control lever 114 when the control lever has been moved to the dump position.

A dump linkage assembly 260 (see FIG. 6) is provided for connecting the control lever 114 to a dump control valve 264 which is shown schematically in FIG. 9 in connection with a schematic illustration of the pump 24. The dump linkage assembly 260 includes a generally L-shaped lever 268 which is pivotally mounted at 270 on the housing or casing 232. The lever 260 includes a central opening 276 through which the sleeve 212 and throttle shaft 226 extend without engaging the lever 268. A lip or latch section 280 is provided on a yoke 206 for engaging a hooked end portion 282 of the lever 268 when the control lever 114 is moved upwardly (as viewed in FIG. 6) toward the dump position. This movement of the control lever 114 pivots the lever 268 at 270 to move a link 290 (see FIGS. 6 and 9) which is pivotally connected to a valve lever 294. The valve lever 294 is pivotally mounted at 296 for movement under the influence of the link 290 to unseat a valve element or ball 300 when the control lever 114 is moved to the dump position.

Unseating or opening of the valve element 300 exhausts the pump section 24 of the hydrostatic transmission 22 to a reservoir to drain the pump section. Draining of the pump section 24 renders the hydrostatic transmission 22 incapable of transmitting power either to or from an associated engine. Movement of the control lever 114 from the dump position results in the dump control valve 264 being closed. A suitable pump assembly (not shown) associated with the engine is then started to pump fluid from the reservoir back to the hydrostatic transmission to again render the hydrostatic transmission capable of transmitting power. In certain installations it may be desirable to locate the dump control valve 264 in the hydraulic circuitry for the hydrostatic transmission in such a manner as to short circuit the hydraulic circuitry for the hydrostatic transmission rather than drain the hydrostatic transmission. In either type of installation, movement of the control lever 114 to the dump position operates the valve 264 to render the hydrostatic transmission 22 incapable of transmitting power either from or to the associated engine.

The manual control lever 114 is biased toward the dump and neutral positions by a spring 304 (FIG. 6) mounted in the housing 232 between the lever 268 and an end wall 308 of the housing. The control lever 114 is pressed toward the neutral position by pressure transmitted from the spring 304 to the manual control lever 114 by the hooked end portion 282 of the lever 268. The manual control lever 114 can be moved to an operated position by pressing downwardly against the control lever to force the control lever to the position shown in solid lines in FIG. 6, against the influence of the spring 304, and pivoting the lever about the central axis 220. This pivoting movement of the lever 114 is facilitated by a bearing assembly 314 which is located between the housing 274 and the sleeve 212.

A spring assembly 319 (see FIG. 4) is connected to the control link 84 to enable the control lever 114 to be moved to the dump position in the event of a stalling of the vehicle.

When the control lever 114 is being moved to the neutral position from either a forward or reverse operated position, smooth operation of the hydrostatic transmission 22 requires that the movement of the control lever be stopped when the control lever is in the neutral position without passing through the neutral position. To this end, a forward blocking shoulder 320 (FIG. 8) is formed on the housing 232 and projects into a slot 324 along which the control lever 114 is moved to vary the rate of power transmission by the hydrostatic transmission 22. The blocking section 246 on the control lever 114 engages the stop shoulder 320 to limit or block movement of the control lever toward a reverse operated position when the control lever has been moved to the neutral position from a forward operated position. The control lever 114 can be moved to a reverse operated position by moving the control lever for a slight distance to the right (as viewed in FIG. 8) to clear the stop shoulder 320, and then continuing the movement of the control lever toward the reverse operated position.

A stop shoulder 328 is provided on the other side of the neutral position for blocking movement of the manual control lever 114 when it is being moved to the neutral position from a reverse operated position. Thus, engagement of the blocking section 246 of the control lever with the stop shoulder 328 stops the control lever when it is being moved from a reverse operated position toward a forward operated position. In this manner the stop shoulders 320 and 328 indicate to an operator of the manual control assembly when the control lever 114 has been moved to the neutral position. When the control lever 114 is in the neutral position, the spring 304 biases the control lever to the right, as viewed in FIG. 8, so that the blocking section 246 engages the stop shoulders 248 and 250 in the manner previously explained. It should be noted that the slot 324 has a width which is approximately equal to the transverse dimension of the blocking section 246 so that movement of the control lever in a transverse direction relative to the slot 324 is limited by engagement of the blocking section 246 with the sides of the slot 324 when the control lever is in either a reverse or a forward operated position.

A neutral position locking shoulder 334 is provided opposite the stop shoulder 328 and cooperates with the stop shoulder 328 to hold the control lever 114 against inadvertent or accidental movement from the neutral position to either a forward or reverse operated position. The control lever 114 is continuously biased to the locked neutral position between the stop shoulder 328 and locking shoulder 334 by the spring 304 (see FIG. 6). This biasing action of the spring 304 results from the previously described spring pressure against the dump lever 268. Thus, the control lever 114 is automatically moved to the locked neutral position between the shoulders 328 and 334 when it is released in the neutral position.

In view of the foregoing remarks it can be seen that the blocking shoulders 320 and 328 prevent the control lever 114 from being moved through the neutral position without being moved transversely relative to the slot 324 to thereby indicate to an operator of the manual control assembly 110 when the control assembly is in a neutral position. The stop shoulder 328 cooperates with a locking shoulder 334 to lock or retain the control lever 114 in the neutral position until the control lever is moved away from the stop shoulders 248 and 250 against the influence of the spring 304. In addition, the stop shoulders 248 and 250 prevent the control lever 114 from being moved to the dump position to disable the hydrostatic transmission without first telescoping the control lever 114 against the influence of spring 234 (see FIG. 6).

An indicator assembly 350 (see FIGS. 10 and 11) is associated with the control lever 114 (see FIGS. 5 and 10) for indicating to an operator of the manual control assembly 110 when the control lever 114 is in a preselected position corresponding to a predetermined input to output speed ratio of the hydrostatic transmission and for resiliently resisting movement of the manual control lever 114 past the preselected position. To this end, the indicator assembly 350 includes a manually positionable or settable slide or cover section 352 which is mounted on the housing 232 and has a pointer 356 (FIG. 5) which cooperates with the forward indicia 124 to indicate the position to which the indicator assembly 350 has been set. The indicator assembly 350 is mounted on the casing 232 by screws 360 which extend through a slot 362 (see FIGS. 10 and 11) to engage mounting posts 366 (FIG. 11) which are secured to an annular ring 370. The ring 370 is mounted in an annular recess 372 (see FIG. 6) in the housing 232 and is rotatable relative to the housing by movement of the manually engageable cover section 352. The screws 360 are loosened to enable the cover section 352 and ring 370 to be moved relative to the housing 232 to a selected position. When the cover section 352 is in the selected position the screws 360 are tightened to securely clamp the cover section 352 against the housing.

Figure 5:
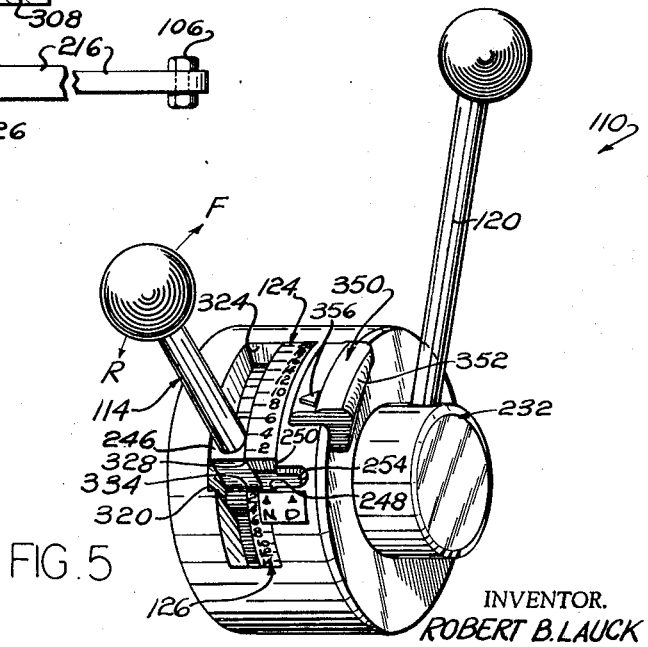
FIG. 5 is a perspective view of a manual control assembly which is associated with the control system of FIG. 3.

A blocking assembly 380 (FIG. 11) is mounted on the movable ring 370 for resiliently blocking movement of the control lever 114 past a preselected position indicated by the cooperation between the indicator 356 and the scale 124 (see FIG. 5). Although the blocking assembly 380 resists movement of the manually operable control lever past the preselected position, the influence of the blocking assembly 380 can be overcome by applying a force to the control lever 114 to move the control lever in a forward direction past the preselected position, the influence of the blocking assembly 380 can be overcome by applying a force to the control lever 114 to move the control lever in a forward direction past the preselected position and the blocking assembly 380. Of course, the input to output speed ratio of the hydrostatic transmission 22 is then increased in the forward direction to a rate which is greater than the rate coresponding to the preselected position. The manually operable control lever 114 can subsequently be moved back toward neutral position past the blocking assembly 380.

The blocking assembly 380 includes a support post or pin 384 which is fixedly mounted on the movable ring 370 and supports a blocking member 388. The blocking member 388 is movable axially along the post 384, against the influence of a spring 390, from the normal or blocking position shown in FIG. 11 to a release position in which a cam section 394 of the control lever 114 can be moved past the blocking assembly 380. In order to move the blocking member 388 from the blocking position shown in FIG. 11 to the release position, the cam section 394 on the control lever 114 includes a first or forward cam surface 396 which engages a corresponding first or forward cam surface 398 on the blocking member 388. The spring 390 presses the blocking member 388 outwardly to resist movement of the control lever 114 past the blocking assembly 380. However, when the force on the control lever 114 is sufficiently great, the cam surface 396 is slid along the cam surface 398 to force the blocking member 388 inwardly to thereby enable the control lever 114 to move past the blocking assembly 380. Similarly, when the control lever 114 is moved toward the neutral position, after having been moved past the blocking assembly 380, a second or reverse cam surface 402 on the cam section 394 engages a second or reverse cam surface 404 on the blocking member 388. The interaction between the cam surfaces 402 and 404 then moves the blocking member 388 axially outwardly relative to the post 384 against the influence of the spring 290 to thereby enable the control lever 114 to be moved past the blocking assembly 380.

The forward cam surfaces 396 and 398 have a relatively steep slope so that a relatively large force is required to move the manual control lever 114 in a forward direction past the blocking assembly 380 to increase the output speed of the hydrostatic transmission 22. The reverse cam surfaces 402 and 404 have a relatively gradual slope to enable the control lever 114 to be moved toward the neutral position past the blocking assembly 380 by the application of the relatively small force to the manual control lever 114. Thus, the blocking assembly 380 provides a relatively large resistance to movement of the manual control lever 114 past a preselected position to indicate to an operator of the manual control assembly 110 that the manual control lever 114 is in the preselected position. However, once the control lever 114 has been moved past the preselected position, the blocking assembly 380 enables the control lever 114 to be moved toward the neutral position with a relatively small force to thereby enable the output speed of the hydrostatic transmission to be decreased.

In view of the foregoing description, it can be seen that the input to output speed ratio of the hydrostatic transmission 22 is selectively controlled through an operating range by a manual control lever 114. A foot operated control assembly 130 is provided for varying to relatively limited extents the input to output speed ratio of the hydrostatic transmission independently of the manually operable control assembly. This independent operation of the manual control assembly 110 and the foot operated control assembly 130 is provided by the control linkage assembly 20. In addition to varying the input to output speed ratio of the hydrostatic transmission 22, the manually operable control lever 114 can be moved to a dump position in which a dump valve 264 is operated to disable the hydrostatic transmission or render the hydrostatic transmission incapable of transmitting power either to or from an associated engine.

A plurality of shoulders 320, 328, 334, 248, and 250 are provided on a housing 232 to prevent the manually operable control lever 114 from being inadvertently moved from a neutral position, in which the hydrostatic transmission 22 is ineffective for transmitting the power from the associated engine, to any one of a plurality of operated positions. The stop shoulders also prevent inadvertent movement of the manually operated control lever 114 between forward and reverse operated positions. In addition, a selectively settable indicator assembly 350 is mounted on the housing 232 to indicate to an operator of the manual control assembly 110 when the control lever 114 has been moved to a preselected operated position. The indicator assembly 350 includes a resilient blocking assembly 380 which is operable to retard or resist movement of the control lever 114 past the preselected position to thereby indicate to an operator that the control lever is in the preselected position. However, the control lever 114 can be moved past the preselected position, against the influence of the block assembly 380, by merely increasing the amount of force applied to the control lever.

Although it is contemplated that the control system 100 will be used in connection with tractors and other vehicles to control the input to output speed ratio of a hydrostatic transmission, it will be apparent to those skilled in the art that the control system 100 can be readily adapted for use in many other environments. It will also be apparent to those skilled in the art that the particular illustrated structure of the control system 100 can be modified without departing from the true spirit and scope of the invention. Therefore, it is contemplated to cover by the appended claims any such changes and modifications which come within the true spirit and scope of the invention.

What is claimed is:

1. Apparatus for controlling the operation of a hydrostatic transmission, said apparatus comprising first control means operatively connected to said hydrostatic transmission for selectively varying the input to output speed ratio of said hydrostatic transmission to enable the input to output speed ratio of said hydrostatic transmission to be adjusted to a predetermined ratio, said first control means being manually operable to a neutral position in which said hydrostatic transmission is ineffective for transmitting power from an engine associated with said hydrostatic transmisison and to a dump position in which said hydrostatic transmission is incapable of transmitting power, and second control means operatively connected to said hydrostatic transmission for selectively increasing and decreasing the input to output speed ratio of said hydrostatic transmission independently of said first control means to thereby enable the input to output speed ratio of said hydrostatic transmission to be varied from said predetermined ratio by said second control means while maintaining said first control means in a condition corresponding to said predetermined input to output speed ratio.

2. Apparatus as set forth in claim 1 wherein said manually operable control means includes a manually engageable lever which is movable between said neutral and dump positions and resilient means for urging said lever to a first position and a stop means for preventing movement of said lever from said neutral position to said dump position when said lever is in said first position, said lever being movable to a second position against the urging of said resilient means to thereby render said stop means ineffective for preventing movement of said lever from said neutral position to said dump position.

3. Apparatus as set forth in claim 1 further including resilient means for urging said first control means toward said neutral and dump positions.

4. Apparatus for controlling the operation of a hydrostatic transmission, said apparatus comprising first control means operatively connected to said hydrostatic transmission for selectively varying the input to output speed ratio of said hydrostatic transmission to enable the input to output speed ratio of said hydrostatic transmission to be adjusted to a predetermined ratio, second control means operatively connected to said hydrostatic transmission for selectively increasing and decreasing the input to output speed ratio of said hydrostatic transmission independently of said first control means to thereby enable the input to output speed ratio of said hydrostatic transmission to be varied from said predetermined ratio by said second control means while maintaining said first control means in a condition corresponding to said predetermined input to output speed ratio, a pivotally mounted control lever operatively connected to said hydrostatic transmission, and a pivotally mounted actuator lever operatively connected to said control lever and to said first and second control means, said actuator lever being pivotal about a first axis associated with said first control means by operation of said second control means to pivot said control lever relative to said hydrostatic transmission to thereby vary the input to output speed ratio of said hydrostatic transmission independently of said first control means, said actuator lever being pivotal about a second axis associated with said second control means by operation of said first control means to pivot said control lever relative to said hydrostatic transmission to thereby vary the onput to output speed ratio of said hydrostatic transmission independently of said second control means.

5. Apparatus for controlling the operation of a hydrostatic transmission, said apparatus comprising first control means operatively connected to said hydrostatic transmission for selectively varying the input to output speed ratio of said hydrostatic transmission to enable the input to output speed ratio of said hydrostatic transmission to be adjusted to a predetermined ratio, second control means operatively connected to said hydrostatic transmission for selectively increasing and decreasing the input to output speed ratio of said hydrostatic transmission independently of said first control means to thereby enable the input to output speed ratio of said hydrostatic transmission to be varied from said predetermined ratio by said second control means while maintaining said first control means in a condition corresponding to said predetermined input to output speed ratio, a servomotor operatively associated with said hydrostatic transmission for varying the input to output speed ratio of said hydrostatic transmission, a servomotor control valve for selectively operating said servomotor, a control lever operatively connected to said servomotor control valve and said hydrostatic transmission, and a pivotally mounted actuator lever operatively connected to said control lever and to said first and second control means, said actuator lever being pivotal about a first axis associated with said first control means by operation of said second control means to pivot said control lever relative to said servomotor control valve to thereby actuate said servomotor control valve to operate said servomotor to vary the input to output speed ratio of said hydrostatic transmission independently of said first control means, said actuator lever being pivotal about a second axis associated with said second control means by operation of said first control means to pivot said control lever relative to said servomotor control valve to thereby actuate said servomotor control valve to operate said servomotor to vary the input to output speed ratio of said hydrostatic transmission independently of said second control means, said control lever being pivotal relative to said actuator lever by operation of said servomotor to enable said servomotor to vary the input to output speed ratio while maintaining substantially constant the positions of said first and second control means.

6. Apparatus for controlling the operation of a hydrostatic transmission, said apparatus comprising first control means operatively connected to said hydrostatic transmission for selectively varying the input to output speed ratio of said hydrostatic transmission to enable the input to output speed ratio of said hydrostatic transmission to be adjusted to a predetermined ratio, second control means operatively connected to said hydrostatic transmission for selectively increasing and decreasing the input to output speed ratio of said hydrostatic transmission independently of said first control means to thereby enable the input to output speed ratio of said hydrostatic transmission to be varied from said predetermined ratio by said second control means while maintaining said first control means in a condition corresponding to said predetermined input to output speed ratio, and means positionable at a preselected location relative to said first control means to retard operation of said first control means when said first control means has been operated to a condition corresponding to a preselected input to output speed ratio of said hydrostatic transmission to thereby indicate to an operator of said apparatus that said first control means has been operated to said condition.

7. Apparatus for controlling the transmission of power by a hydrostatic transmission, said apparatus comprising a control linkage assembly operatively associated with said hydrostatic transmission and operable to vary the input to output speed ratio of said hydrostatic transmission, a plurality of separate control means each of which is associated with said control linkage assembly to effect operation thereof, one of said control means being selectively operable to vary the input to output speed ratio of said hydrostatic transmission and to render said hydrostatic transmission incapable of transmitting power, said one of said control means being a manually actuatable means which is operable to vary the input to output speed ratio of said hydrostatic transmission through a predetermined operating range to enable the input to output speed ratio of said hydrostatic transmission to be adjusted to a predetermined ratio within said operating range and another of said control means is a pedal which is selectively operable to increase and decrease the input to output speed ratio of said hydrostatic transmission for relatively limited extents from said predetermined ratio independently of said manually actuatable means to thereby enable the input to output speed ratio of said hydrostatic transmission to be varied from said predetermined ratio by said operation of said pedal while maintaining said manually actuatable means in a condition corresponding to said predetermined input to output speed ratio, and indicator means for retarding the operation of said manually actuatable means past a preselected condition with one force when said manually actuatable means is being operated to increase the output speed of said hydrostatic transmission, said indicator means being operative to retard the operation of said manually actuatable means past said preselected condition with another force which is less than said one force when said manually actuatable means is being operated to decrease the output speed of said hydrostatic transmission.

8. Apparatus for controlling the transmission of power by a hydrostatic transmission, said apparatus comprising a control linkage assembly operatively associated with said hydrostatic transmission and operable to vary the input to output speed ratio of said hydrostatic transmission and a plurality of separate control means each of which is associated with said control linkage assembly to effect operation thereof, one of said control means being selectively operable to vary the input to output speed ratio of said hydrostatic transmission and to render said hydrostatic transmission incapable of transmitting power, said control linkage assembly including an actuator lever and a control lever which is pivotally connected to said actuator lever and is pivotal relative to said hydrostatic transmission to vary the input to output speed ratio of said hydrostatic transmission, said actuator lever being pivotal relative to said one control means by operation of another of said control means to pivot said control lever through a distance which is a function of a distance through which said actuator lever is pivoted to vary the input to output speed ratio of said hydrostatic transmission by an amount which is a function of a distance through which said other control means is operated while maintaining the position of said one control means substantially constant, said actuator lever being pivotal relative to said other control means by operation of said one control means to pivot said control lever through a distance which is a function of a distance through which said actuator lever is pivoted to vary the input to output speed ratio of said hydrostatic transmission by an amount which is a function of a distance through which said one control means is operated while maintaining the position of said other control means substantially constant.

9. Apparatus for controlling the operation of a hydrostatic transmission, said apparatus comprising manually operable means selectively movable between a neutral position, a plurality of forward operated positions, a plurality of reverse operated positions and a dump position, connector means for operatively connecting said manually operable means to said hydrostatic transmission, said connector means being operable by movement of said manually operable means to said neutral position to render said hydrostatic transmission ineffective for transmitting power from an engine with which said hydrostatic transmission is associated, said connector means being operable by movement of said manually operable means to one of said plurality of forward operated positions to adjust said hydrostatic transmission to provide an input to output speed ratio which is a function of the distance between said one of said plurality of forward operated positions and said neutral position, said connector means being operable by movement of said manually operable means to one of said plurality of reverse operated positions to adjust said hydrostatic transmission to transmit power in another direction at a rate which is a function of the distance between said one of said plurality of reverse operated positions and said neutral position, means operable by movement of said manually operable means to said dump position to render said hydrostatic transmission incapable of transmitting power, and stop means on said manually operable means for engaging a shoulder formed on a housing associated with said manually operable means when said manually operable means is in said neutral position to block movement of said manually operable means to said dump position, said manually operable means being selectively operable to disengage said stop means from said shoulder to enable said manually operable means to be moved to said dump position from said neutral position.

10. Apparatus for controlling the operation of a hydrostatic transmission, said apparatus comprising manually operable means selectively movable between a neutral position, a plurality of forward operated positions, a plurality of reverse operated positions and a dump position, connector means for operatively connecting said manually operable means to said hydrostatic transmission, said connector means being operable by movement of said manually operable means to said neutral position to render said hydrostatic transmission ineffective for transmitting power from an engine with which said hydrostatic transmission is associated, said connector means being operable by movement of said manually operable means to one of said plurality of forward operated positions to adjust said hydrostatic transmission to provide an input to output speed ratio which is a function of the distance between said one of said plurality of forward operated positions and said neutral position, said connector means being operable by movement of said manually operable means to one of said plurality of reverse operated positions to adjust said hydrostatic transmission to transmit power in another direction at a rate which is a function of the distance between said one of said plurality of reverse operated positions and said neutral position, and means operable by movement of said manually operable means to said dump position to render said hydrostatic transmission incapable of transmitting power, stop means on said manually operable means for engaging a first shoulder formed on a housing associated with said manually operable means when said manually operable means is being moved to said neutral position from a forward operated position to thereby at least partially block movement of said manually operable means past said neutral position to a reverse operated position, said stop means being engageable with a second shoulder formed on said housing when said manually operable means is being moved to said neutral position from a reverse operated position to thereby at least partially block movement of said manually operable means past said neutral position to a forward operated position, said manually operable means being movable to disengage said stop means from said first shoulder when said manually operable means is in said neutral position to thereby enable said manually operable means to be moved to a reverse operated position from said neutral position, said manually operable means being movable to disengage said stop means from said second shoulder when said manually operable means is in said neutral position to thereby enable said manually operable means to be moved to a forward operated position from said neutral position.

11. Apparatus as set forth on claim 10 wherein said stop means is positionable between one of said first and second shoulders and a third shoulder formed on said housing when said manually operable means is in said neutral position to thereby at least partially block movement of said manually operable means to both a forward operated position and a reverse operated position, said manually operable means being movable relative to said stop means from said position between said one shoulder and said third shoulder to thereby enable said manually operable means to be moved to an operated position from said neutral position.

12. Apparatus as set forth in claim 11 further including biasing means operatively connected to said manually operable means for urging said manually operable means to said position between said one and third shoulders when said manually operable means is in said neutral position.

13. Apparatus as set forth in claim 12 wherein said biasing means urges said stop means into engagement with a fourth shoulder formed on said housing when said stop means is in said position between said one and third shoulders to thereby at least partially block movement of said manually operable means to said dump position, said manually operable means being selectively movable to disengage said stop means from said fourth shoulder to thereby enable said manually operable means to be moved to said dump position.

14. Apparatus as set forth in claim 27 further including a control assembly associated with said hydrostatic transmission and said manually operable means, said control assembly being operable by said manually operable means to vary the input to output speed ratio of said hydrostatic transmission, and pedal means connected to said control assembly for varying the input to output speed ratio of said hydrostatic transmission independently of said manually operable means.

15. Apparatus as set forth in claim 13 further including indicator means operatively associated with said manually operable means and settable to a preselected position relative to said housing for resiliently resisting movement of said manually operable means past said preselected position.

16. An assembly comprising a hydrostatic transmission, a servomotor associated with said hydrostatic transmission for varying the input to output speed ratio by said hydrostatic transmission, a servomotor control valve operatively associated with said servomotor for controlling the operation of said servomotor, a control linkage assembly including a control link operatively connected to said servomotor and said servomotor control valve for operating said servomotor control valve and an actuator link pivotally connected to said control link for pivoting said control link about a first axis to at least partially open said servomotor control valve to thereby operate said servomotor, said control link being pivotal about a second axis by operation of said servomotor to close said servomotor control valve, manually operable control means connected to said actuator link for operating said control linkage assembly to vary the input to output speed ratio of said hydrostatic transmission through a predetermined operating range to enable the input to output speed ratio of said hydrostatic transmission to be adjusted to a predetermined ratio within said operating range, said manually operable control means being selectively movable in a first direction from a neutral position in which said hydrostatic transmission is ineffective to transmit power from an associated engine to a forward operated position in which said hydrostatic transmission is operable to transmit power in one direction at a speed which is a function of the distance which said manually operable means is moved in said first direction, said manually operable means being movable in a second direction from said neutral position to a reverse operated position in which said hydrostatic transmission is operable to transmit power in another direction at a speed which is a function of the distance which said manually operable means is moved in said second direction, said manually operable means being movable from said neutral position to a dump position in which said hydrostatic transmission is incapable of transmitting power, a selectively settable indicator means being associated with said manually operable means for resiliently resisting movement of said manually operable means past a preselected position to thereby indicate to an operator of the hydrostatic transmission that said manually operable means is in said preselected position, said manually operable means being movable past said preselected position against the influence of said indicator means to thereby enable the output speed of said hydrostatic transmission to be increased to a speed above a speed corresponding to said preselected position, and pedal means operatively connected to said actuator link for selectively increasing and decreasing the output speed in both of said directions by said hydrostatic transmission for relatively limited extents from said predetermined speed independently of said manually operable control means to thereby enable the input to output speed ratio of said hydrostatic transmission to be varied from said predetermined ratio by said pedal means while maintaining said manually operable means in a position corresponding to said perdetermined input to output speed ratio.

17. A control apparatus for varying the speed ratio of a hydrostatic transmission comprising a manually operable control member movable to vary the speed ratio of the hydrostatic transmission, a selectively settable indicator member located in the path of movement of said control member and engageable therewith to indicate to an operator when said control member is in a preselected position, said indicator member being slidable along an arcuate path relative to said casing to settings corresponding to various speed ratios and having a pointer means on said indicator member cooperating with indicia for indicating the speed ratio of said hydrostatic transmission to which said indicator member is set and a resilient locking means for retaining said indicator member in a position to which it is set, means supporting said indicator member for withdrawing movement out of the path of movement of said control member, and means for effecting said withdrawing movement of said indicator member in response to continued forceful movement of said control member after engagement with said indicator member to enable said control member to move past said preselected position to thereby cause the rate of power transmission by said hydrostatic transmission to be increased to a rate above a rate corresponding to said preselected position.

18. Apparatus for enabling an operator to control the operation of a hydrostatic transmission, said apparatus comprising first control means adapted to be actuated by the operator and operatively connected to said hydrostatic transmission for selectively adjusting the input to output speed ratio of said hydrostatic transmission to a speed ratio corresponding to a predetermined output speed, and second control means adapted to be actuated by the operator and operatively connected to said hydrostatic transmission for selectively increasing the input to output speed ratio of said hydrostatic transmission to an input to output speed ratio which is greater than the speed ratio corresponding to the predetermined output speed and for selectively decreasing the input to output speed ratio of said hydrostatic transmission to an input to output speed ratio which is less than the speed ratio corresponding to the predetermined output speed while maintaining said first control means in a condition corresponding to the predetermined output speed to enable the output speed of said hydrostatic transmission to be selectively increased and decreased relative to the predetermined output speed in response to actuation of said second control means by the operator.

19. Apparatus as set forth in claim 18 wherein said first control means is selectively operable to effect operation of said hydrostatic transmission at a predetermined output speed in either of two directions, said second control means being selectively operable to change the output speed and direction of operation of said hydrostatic transmission from the predetermined output speed in one of the directions to an output speed in the other direction.

20. Apparatus as set forth in claim 18 wherein said second control means is a pedal which is movable in one direction to effect an increase in the output speed of said hydrostatic transmission relative to the predetermined output speed and in a second direction to effect a decrease in the output speed of said hydrostatic transmission relative to the predetermined output speed.

21. Apparatus for controlling the transmission of power by a hydrostatic transmission which is operable to transmit power in either of two directions, said apparatus comprising a control linkage assembly operatively associated with said hydrostatic transmission and operable to vary the input to output speed ratio of said hydrostatic transmission during operation of the hydrostatic transmission in either of the two directions and a plurality of separate control means each of which is associated with said control linkage assembly to effect operation thereof, one of said control means being selectively operable to increase and decrease the input to output speed ratio of said hydrostatic transmission through an operating range of said hydrostatic transmission in either of the two directions, and another of said control means being selectively operable to increase and decrease the input to output speed ratio of said hydrostatic transmission through a relatively limited portion of said operating range to enable the output speed of said hydrostatic transmission to be increased and decreased in either of the two directions to a relatively limited extent from an output speed determined by the condition of said one control means by operating said other control means.

22. Apparatus as set forth in claim 21 wherein said one of said control means includes a manually actuatable member which is operable to a neutral condition in which said hydrostatic transmission is ineffective for transmitting power and to a dump condition in which said hydrostatic transmission is incapable of transmitting power, said other control means including a pedal which is selectively operable when said control member is in the neutral condition to enable said hydrostatic transmission to transmit power in either of the two directions.

23. Apparatus as set forth in claim 21 wherein said one control means includes a member operable to a neutral condition in which said hydrostatic transmission is ineffective for transmitting power from an engine associated with said hydrostatic transmission and to dump condition in which said hydrostatic transmission is incapable of transmitting power.

24. An apparatus as set forth in claim 9 further including valve means located in hydraulic circuitry operatively associated with said hydrostatic transmission, said valve means being operable by movement of said manually operable means to said dump position to change the condition of said hydraulic circuutry to render said hydrostatic transmission incapable of transmitting power.

25. A control apparatus for varying the speed ratio of a hydrostatic transmission comprising a manually operable control member which is selectively movable to vary the input to output speed ratio of the hydrostatic transmission to thereby increase and decrease the output speed of the hydrostatic transmission, selectively settable indicator means located in the path of movement of said control member and engageable therewith to indicate to an operator when said manually operable control member is in a preselected position, said indicator means being movable to settings corresponding to various speed ratios of the hydrostatic transmission and including means for indicating the setting to which said indicator means is set and locking means for retaining said indicator means in a position to which it is set, said indicator means further including means for retarding movement of said manually operable control member past a preselected setting with one force when said manually operable control is being operated to increase the outspeed of said hydrostatic transmission and for retarding movement of said manually operable control member past said preselected setting with another force which is less than said one force when said manually operable control member is being operated to decrease the output speed of said hydrostatic transmission.

References Cited

UNITED STATES PATENTS

| 2,505,727 | 4/1950 | Vickers et al. | 60—53 XR |
| 3,224,197 | 12/1965 | Lauck | 60—53 |
| 3,316,773 | 5/1967 | Findlay | 74—481 |
| 3,390,523 | 7/1968 | Heidemann et al. | |
| 3,401,522 | 9/1968 | Hann et al. | 60—53 |

EDGAR W. GEOGHEGAN, Primary Examiner

U.S. Cl. X.R.

74—481; 91—1